United States Patent Office 3,061,627
Patented Oct. 30, 1962

3,061,627
PRODUCTION OF ESTERS OF OXYGEN ACIDS OF BORON
Konrad Lang, Alex Bürger, Elmar Manfred Horn, and Karl Nützel, all of Leverkusen, Germany, assignors to Farbenfabriken Bayer Aktiengesellschaft, Leverkusen, Germany, a corporation of Germany
No Drawing. Filed Oct. 4, 1960, Ser. No. 60,316
Claims priority, application Germany Oct. 23, 1959
11 Claims. (Cl. 260—462)

The invention relates to the production of esters of oxygen acids of boron having the general formula $$R_nB(OR')_{3-n}$$

in this formula, R denotes an alkyl, haloalkyl or aralkyl radical, $n$ the number 1 or 2 R' an aliphatic cycloaliphatic or aromatic radical.

Alkylboronic acid esters are known to be valuable additives to engine fuels which substantially increase the antiknock property. From dialkylborinic acid esters the free dialkylborinic acids can be obtained in a simple manner by hydrolysis and from these the dialkylborinic acid anhydrides used as age resistors can be produced by the splitting off of water.

However, the production of these important compounds has hitherto been possible only by difficult methods. The chemical literature especially describes many variations of the reaction of boric acid esters with alkylating agents. The substances serving as alkylating agents are however always compounds which are difficult to handle and sensitive to humidity and/or air such as alkali metal alkyls, Grignard compounds, aluminum alkyls or boron trialkyls. The partial oxidation of boron trialkyls or their reaction with alcohols at an elevated temperature is likewise substantially complicated by the self-oxidizability of boron trialkyls.

The object of the present invention is to provide a process for the production of esters of oxygen acids of boron having the general formula $$R_nB(OR')_{3-n}$$

which is characterized by reacting esters of haloboric acids of the formula $$X_nB(OR')_{3-n}$$

with alkali metal or alkaline earth metal borohydrides and olefines.

In the above mentined formulae $n$ denotes 1 or 2, R an alkyl radical which contains at least two carbon atoms and may be substituted by aryl groups or halogen atoms, for example ethyl, propyl, butyl, amyl, hexyl, octyl nonyl, dodecyl, hexadecyl, octadecyl; in these radicals one or more hydrogen atoms may be replaced by halogen atoms such as fluorine, chlorine or bromine, or by aryl radicals such as phenyl, tolyl, xylyl, naphthyl, so that R denotes an alkyl, haloalkyl or aralkyl group; X means a halogen atom, particularly fluorine, chlorine or bromine, and R' an alkyl, cycloalkyl, alkoxyalkyl, aminoalkyl, alkylaminoalkyl, aryl, alkoxyaryl, alkylaryl, aminoaryl, alkylaminoaryl group. As examples of these substances there may be mentioned methyl, ethyl, propyl, butyl, amyl, hexyl, octyl, nonyl, dodecyl, octadecyl or hexadecyl; in these alkyl groups one or more hydrogen atoms may be replaced by alkoxy groups such as methoxy ethoxy, propoxy or butoxy, by the amino group, by alkylamino or dialkylamino groups such as methylamino, dimethylamino, ethylamino, diethylamino, propylamino or dipropylamino; cycloalkyl groups are for example cyclopentyl, cyclohexyl and cyclooctyl; aryl radicals are for example phenyl, tolyl, xylyl and naphthyl; in these, one or more hydrogen atoms may be replaced, as described above for the alkyl groups, by alkyl groups, the amino groups or also by alkylamino and dialkylamino radicals. If $n$ equals the number 1, 2R' may also be a bivalent alkyl radical, for example $$-CH_2-CH_2-, \quad -CH_2-CH_2-CH_2-$$

The process of the invention uses alkali metal and alkaline earth metal borohydrides. For reasons of economy, sodium borohydride is chiefly used, but it is also possible to employ other borohydrides of this group, for example lithium borohydride, potassium borohydride or calcium borohydride.

The olefines serving for the production of alkylboronic or dialkylborinic acid esters are derived from the radicals defined in the above description by "R," by splitting off a hydrogen atom of the alkyl radical. Suitable compounds are therefore e.g. ethylene, propylene, butylene, amylene, hexene, octene, nonene, dodecene, hexadecene and octadecene as well as the halo-olefines and arylolefines derived therefrom by substitution of one or more hydrogen atoms.

For the production of dialkylborinic acid esters it is expedient to start from difluoroboric acid esters which are especially easily obtained. In this case the reaction proceeds according to the following equation:

$$NaBH_4 + 2F_2BOR' + 4C_mH_{2m} \rightarrow 2(C_mH_{2m+1})_2BOR' + NaBF_4$$

The reaction is expediently carried out by adding the haloboric acid ester or its solutioin in an inert solvent dropwise while stirring to a suspension or solution of finely divided alkali metal or alkaline earth metal borohydride in an inert liquid distributing agent, adding the olefine simultaneously; if the boiling point of the olefine lies above the reaction temperature, it may be mixed first with the borohydride.

As solvent or distributing agents there may be used for the process alkyl ethers such as diethyl ether, diisopropyl ether, tetrahydrofurane, dioxane, ethyleneglycoldimethyl ether, diethyleneglycol dimethyl ether or tetraethyleneglycol ether as well as saturated aliphatic or aromatic hydrocarbons or mixtures thereof.

The optimum reaction temperature lies between 30 and 100° C. but, generally speaking, temperatures between −20° C. and the decomposition point of the reactants or between −20° C. and the boiling point of the solvent may be used.

With the process according to the invention it is not necessary to start directly from haloboric acid esters of the formula $X_nB(OR')_{3-n}$; the production of alkylboronic acid or dialkylborinic acid esters may also be combined with a process for the production of haloboric acid esters known as such, for example by introducing boron trihalide into a mixture of borohydride and boric acid ester in a solvent.

According to a special method of carrying out the invention, esters of the formula $R_nB(OR')_{3-n}$ are produced by reacting borohydrides with boric acid esters of the formula $B(OR')_3$, organic addition compounds of boron trihalide and with olefines:

$$2B(OR')_3 + 4BX_3 + 3NaBH_4 + 12C_mH_{2m} \rightarrow$$
$$6(C_mH_{2m+1})_2BOR' + 3NaBH_48B(OR')_3 +$$
$$4BX_3 + 3NaBH_4 + 12C_mH_{2m} \rightarrow 12C_mH_{2m+1}B(OR')_2 +$$
$$3NaBH_4$$

Also in this case, the explanation given above is valid for the olefines to be used as well as for the selection of the borohydrides. The composition of the boric acid esters serving as starting products results from the formula $B(OR')_3$ wherein R' has the above mentioned significance.

The boron trihalides of the formula $BX_3$ wherein X represents the above mentioned halogens, are used in the form of their organic addition compounds, preferably with ethers such as dimethyl ether, diethyl ether, dioxane, tetrahydrofurane, diisopropyl ether, dipropyl ether, dibutyl ether and the dimethyl ethers of ethyleneglycol, diethyleneglycol, tri- and tetraethyleneglycol.

The reaction is carried out at the same temperatures and with the use of the same solvents as described above.

The esters of alkylboronic acids or dialkylborinic acids with lower alcohols, for example methanol, ethanol, propanol, butanol or amyl alcohol, can be very easily converted into the esters of higher boiling alcohols such as higher alkyl alcohols, alkoxyalkyl alcohols or amino alcohols of the formula R'OH wherein R' has the above mentioned significance, by heating the esters of lower alcohols with higher alcohols, if necessary in a vacuum, to temperatures between the boiling point of the lower alcohol and that of the higher boiling alcohol, until the lower alcohol bonded in the ester is completely distilled off, by subsequently removing any excess of higher boiling alcohol by distillation and further purifying the residual alkylboronic acid or dialkylborinic acid ester of the higher boiling alcohol, if so desired.

The process of the invention implies a technical advance in several respects. It starts for the first time from products which can be handled without danger and are themselves also obtainable without danger. The reaction itself proceeds likewise under conditions which are easily controlled. Moreover the starting products, i.e. boron trihalides, their organic addition products, boric acid esters, haloboric acid esters, borohydrides and olefines, are inexpensive substances which can be easily obtained on a technical scale.

The following examples are given for the purpose of illustrating the invention.

*Example 1*

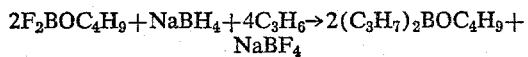

45 g. (1.2 mols) of finely powdered sodium borohydride are suspended in 800 ml. of dry tetrahydrofurane and 244 g. (2 mols) of difluoroboric acid-n-butyl ester are added dropwise with vigorous stirring and the simultaneous introduction of propylene. The reaction temperature is 50–60° C. After the addition of the fluoroboric acid ester, the mixture is boiled under reflux for 3 hours, propylene being passed through, then cooled, filtered, the tetrahydrofurane is distilled off under normal pressure and the residue fractionated under vacuum. Dipropylboric acid butyl ester is thus obtained in a yield of more than 80%, in addition to propylboric acid dibutyl ester.

*Example 2*

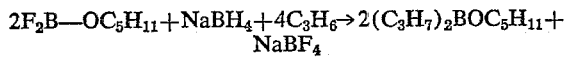

As described in Example 1, 45 g. (1.2 mols) of sodium borohydride are reacted with 272 g. (2 mols) of difluoroboric acid amyl ester and propylene whereupon dipropylboric acid amyl ester is obtained in the same yield in addition to propylboric acid diamyl ester.

*Example 3*

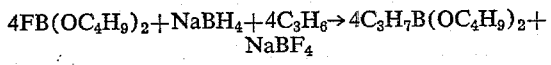

Similarly to Example 1, 45 g. (1.2 mols) of sodium borohydride are reacted with 704 g. (4 mols) of fluoroboric acid dibutyl ester and propylene whereupon propylboric acid dibutyl ester is obtained in a yield of more than 80% in addition to dipropylboric acid butyl ester.

*Example 4*

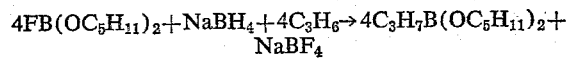

Similarly to Example 1, 45 g. (1.2 mols) of sodium borohydride are reacted with 816 g. (4 mols) of fluoroboric acid diamyl ester and propylene whereupon propyl-boric acid diamyl ester is obtained in a yield of more than 80% in addition to dipropylboric acid amyl ester.

*Example 5*

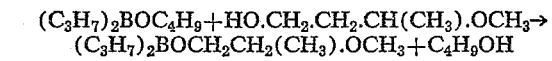

A mixture of 170 g. (1 mol) of dipropylboric acid butyl ester is slowly heated with 156 g. (1.5 mols) of 3-methoxybutanol-1 under normal pressure to 150° C., until the butanol is completely distilled off. By subsequent fractional distillation under vacuum, dipropylboric acid -(3-methoxybutyl-1) ester is obtained in the pure form.

*Example 6*

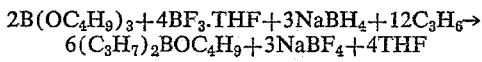

137 g. (3.6 mols) of finely powdered sodium borohydride are suspended in 2.4 litres of dry tetrahydrofurane. 460 g. (2 mols) of boric acid-n-butyl ester and 560 g. (4 moles) of borontrifluoride-tetrahydrofuranate are continuously added dropwise with stirring and the simultaneous introduction of propylene, the reaction temperature amounting to 40–60° C. After termination of the addition, the mixture is boiled under reflux for 4 hours while passing through propylene, cooled down, filtered, the residue after filtration is washed with dry tetrahydrofurane and the tetrahydrofurane distilled off under normal pressure. The residue is fractionated under vacuum. Dipropylboric acid butyl ester is thus obtained in good yield, in addition to propylboric acid dibutyl ester.

We claim:

1. A process for the production of esters of oxygen acids of boron having the formula

wherein R represents a member selected from the group consisting of alkyl, haloalkyl and aralkyl radicals, $n$ is an integer ranging from 1 to 2 and R' is a member selected from the group consisting of alkyl, cycloalkyl, alkoxyalkyl, aminoalkyl, alkylaminoalkyl, aryl, alkoxyaryl, aminoaryl and alkylaminoaryl radicals, which comprises reacting an ester of a halogeno boric acid having the formula $X_nB(OR')_{3-n}$, wherein X represents a halogen atom, $n$ and R 'are as defined above, with a member selected from the group consisting of olefins, haloolefins and arylolefins and a borohydride selected from the group consisting of alkali and alkaline earth metal borohydrides, and recovering the ester thereby formed.

2. A process according to claim 1, in which the reaction is carried out in an inert liquid carrier selected from the group consisting of alkyl ethers and hydrocarbons.

3. A process according to claim 2, in which the starting material is a difluoroborinic acid ester of the formula $F_2BOR'$.

4. A process according to claim 2, in which the starting material is a monofluoroboronic acid ester of the formula $FB(OR')_2$.

5. A process according to claim 2, in which the starting material is a sodium borohydride.

6. A process for the preparation of dipropyl borinic acid butylester which comprises reacting a slurry of sodium borohydride in tetrahydrofurane with propylene and difluoroborinic acid butylester and recovering the ester formed.

7. A process for the preparation of dipropyl borinic acid amyl ester which comprises reacting a slurry of sodium borohydride in tetrahydrofurane with propylene and difluoroborinic acid amylester and recovering the ester formed.

8. A process for the preparation of esters of oxygen acids of boron having the formula $R_nB (OR')_{3-n}$ wherein R represents a member selected from the group consisting of alkyl, haloalkyl and aralkyl radicals, $n$ is an integer ranging from 1 to 2 and R' is a member selected from the group consisting of alkyl, cycloalkyl, alkoxyalkyl, aminoalkly, alkylaminoalkyl, aryl, alkoxyaryl, aminoaryl and alkylaminoaryl radicals, which comprises reacting an ester of a halogeno boric acid having the formula $$X_nB(OR')_{3-n}$$

wherein X represents a halogen atom, $n$ and R' are as defined above, with a member selected from the group consisting of olefins, haloolefins and arylolefins and a borohydride selected from the group consisting of alkali and alkaline earth metal borohydrides, thereafter heating said ester with an alcohol of the formula R'OH the boiling point of which is higher than the boiling point of the alcohol from which the said aforesaid ester is derived to a temperature between the boiling point of the lower boiling alcohol and the higher boiling alcohol of the formula R'OH, and distilling off the lower boiling alcohol from the reaction mixture, and recovering the ester of the formula $R_nB(OR')_{3-n}$.

9. A process for the production of dipropylborinic acid methoxybutylester which comprises reacting a slurry of sodium borohydride in tetrahydrofurane with propylene and difluoroborinic acid butylester to form dipropyl borinic acid butylester, heating this dipropylborinic acid butylester with methoxy butanol to a temperature between the boiling points of butanol and methoxy-butanol, distilling off butanol from the reaction mixture and recovering the dipropyl borinic acid methoxybutylester formed.

10. Process for the production of esters of oxygen acids of boron having the formula $R_nB(OR')_{3-n}$ wherein R represents a member selected from the group consisting of alkyl, haloalkyl and aralkyl radicals, $n$ is an integer ranging from 1 to 2 and R' is a member selected from the group consisting of alkyl, cycloalkyl, alkoxyalkyl, aminoalkyl, alkylaminoalkyl, aryl, alkoxyaryl, aminoaryl and alkylaminoaryl radicals, which comprises reacting a borohydride selected from the group consisting of alkali and alkaline earth metal borohydrides with a member selected from the group consisting of olefins, haloolefins and arylolefins and an addition compound of a boron trihalide with an alkyl ether, and recovering the ester thereby formed.

11. A process for the production of dipropyl borinic acid butylester which comprises reacting a slurry of sodium borohydride in tetrahydrofurane with tributylborate, boron trifluoride tetrahydrofurane addition compound and propylene and recovering the ester formed.

No references cited.

UNITED STATES PATENT OFFICE
CERTIFICATE OF CORRECTION

Patent No. 3,061,627                                        October 30, 1962

Konrad Lang et al.

It is hereby certified that error appears in the above numbered patent requiring correction and that the said Letters Patent should read as corrected below.

Column 1, line 64, after "methoxy" insert a comma; column 2, line 4, after the formula insert a period; lines 24 and 25, after the formula insert a period; line 34, for "solvent" read -- solvents --; column 2, lines 59 to 61, after the formula insert a period; column 4, lines 5 and 6, the second line of the formula should appear as shown below instead of as in the patent:

$$(C_3H_7)_2BOCH_2CH_2CH(CH_3).OCH_3 + C_4H_9OH$$

line 21, for "moles" read -- mols --; column 5, line 2, for "aminoalkly" read -- aminoalkyl --.

Signed and sealed this 26th day of March 1963.

(SEAL)
Attest:

ESTON G. JOHNSON
Attesting Officer

DAVID L. LADD
Commissioner of
Patents